United States Patent
Bruzzone (10) Patent No.: US 7,686,453 B2
(45) Date of Patent: Mar. 30, 2010

(54) HIGH CONTRAST LIQUID CRYSTAL DISPLAY AND PROJECTION SYSTEM USING SAME

(75) Inventor: Charles L. Bruzzone, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 944 days.

(21) Appl. No.: 11/311,873

(22) Filed: Dec. 19, 2005

(65) Prior Publication Data

US 2007/0139620 A1    Jun. 21, 2007

(51) Int. Cl.
G03B 21/14    (2006.01)
G03B 21/00    (2006.01)

(52) U.S. Cl. .......................... 353/20; 353/33
(58) Field of Classification Search .............. 353/20, 353/33, 37, 81, 98, 99, 122
See application file for complete search history.

(56) References Cited

U.S. PATENT DOCUMENTS

| | | | |
|---|---|---|---|
| 4,974,132 A | 11/1990 | Naum | |
| 5,335,158 A | 8/1994 | Kaplan et al. | |
| 5,826,959 A * | 10/1998 | Atsuchi | 353/20 |
| 5,882,774 A | 3/1999 | Jonza et al. | |
| 5,962,114 A | 10/1999 | Jonza et al. | |
| 6,109,767 A | 8/2000 | Rodriguez | |
| 6,288,844 B1 | 9/2001 | Edlinger et al. | |
| 6,486,997 B1 | 11/2002 | Bruzzone et al. | |
| 6,527,411 B1 | 3/2003 | Sayers | |
| 6,529,250 B1 | 3/2003 | Murakami et al. | |
| 6,532,044 B1 | 3/2003 | Conner et al. | |
| 6,550,919 B1 | 4/2003 | Heine | |
| 6,557,999 B1 | 5/2003 | Shimizu | |
| 6,592,224 B2 | 7/2003 | Ito et al. | |
| 6,609,795 B2 | 8/2003 | Weber et al. | |
| 6,646,806 B1 | 11/2003 | Bierhuizen | |

(Continued)

FOREIGN PATENT DOCUMENTS

EP    1 431 781    6/2004

(Continued)

OTHER PUBLICATIONS

Electronic Projection—Fixed Resolution Projectors, ANSIi/NAPM IT7.228-1997.

(Continued)

Primary Examiner—Georgia Y Epps
Assistant Examiner—Bao-Luan Le (57) ABSTRACT

A projection system includes a projection lens unit, a color combiner, and at least a first and a second image-forming devices for generating single color images. The single color images are combined in the color combiner to produce a colored image light beam. The colored image light beam passes from the color combiner to the projection lens system. A polarization control element is disposed between the color combiner and the first image-forming device. The polarization control element alters the polarization of light at either one of the first and second color, while not altering the polarization of light of the other of the first and second color. In some embodiments, the polarization control element is oriented to substantially prevent light at the second color from passing from the color combiner to the first image-forming device via a polarizing beamsplitter.

8 Claims, 11 Drawing Sheets

U.S. PATENT DOCUMENTS

| | | | |
|---|---|---|---|
| 6,669,344 B2* | 12/2003 | Ishii | 353/20 |
| 6,719,426 B2 | 4/2004 | Magarill et al. | |
| 6,778,228 B2 | 8/2004 | Murakami et al. | |
| 6,811,261 B2 | 11/2004 | Kurumisawa | |
| 6,914,654 B2 | 7/2005 | Janssen | |
| 6,916,440 B2 | 7/2005 | Jackson et al. | |
| 6,936,209 B2 | 8/2005 | Jackson et al. | |
| 6,939,499 B2 | 9/2005 | Merrill et al. | |
| 6,949,212 B2 | 9/2005 | Merrill et al. | |
| 7,077,526 B2 | 7/2006 | Overmann et al. | |
| 7,101,047 B2* | 9/2006 | Florence et al. | 353/20 |
| 7,152,979 B2 | 12/2006 | Ellis et al. | |
| 7,168,820 B1 | 1/2007 | Minassian | |
| 7,377,655 B2* | 5/2008 | Manabe et al. | 353/33 |
| 2003/0025879 A1* | 2/2003 | Ishii | 353/20 |
| 2003/0071888 A1* | 4/2003 | Roddy et al. | 347/232 |
| 2003/0227680 A1* | 12/2003 | Chen et al. | 359/498 |
| 2004/0066492 A1* | 4/2004 | Nakashima et al. | 353/20 |
| 2004/0085634 A1* | 5/2004 | Stahl et al. | 359/442 |
| 2004/0130784 A1* | 7/2004 | Williams et al. | 359/485 |
| 2004/0184006 A1* | 9/2004 | Okuyama et al. | 353/20 |
| 2004/0189948 A1* | 9/2004 | Okuyama et al. | 353/20 |
| 2004/0227898 A1 | 11/2004 | Ma et al. | |
| 2004/0227994 A1 | 11/2004 | Ma et al. | |
| 2005/0007555 A1* | 1/2005 | Manabe et al. | 353/20 |
| 2005/0012996 A1 | 1/2005 | Miyazawa et al. | |
| 2005/0062936 A1* | 3/2005 | Okuyama et al. | 353/20 |
| 2006/0044516 A1* | 3/2006 | Inoko | 353/20 |
| 2006/0103791 A1 | 5/2006 | Zhu et al. | |
| 2006/0262275 A1* | 11/2006 | Domroese et al. | 353/20 |
| 2007/0146638 A1 | 6/2007 | Ma et al. | |
| 2007/0146644 A1 | 6/2007 | Ma et al. | |

FOREIGN PATENT DOCUMENTS

| | | |
|---|---|---|
| JP | 06222321 | 8/1994 |
| KR | 10-2004-0007775 | 1/2004 |
| KR | 10-2005-0055235 | 6/2005 |
| WO | WO 2004/072713 | 8/2004 |

OTHER PUBLICATIONS

U.S. Appl. No. 10/914,596, filed Aug. 9, 2004 entitled Projection Display System Using Multiple Light Sources and Polarizing Element for Using with Same.

"Metric Beam Dump", Edmund Optics Inc., Barrington, New Jersey, USA [on line], [retrieved from the internet on Oct. 6, 2005], URL www.edmundoptics.com/onlinecatalog/Display.Product.cmf?productid=2193 pp. 1-2.

"Black Reflections", [retrieved from the internet on Oct. 6, 2005], URL www.mazepath.com/unclealiblade.htm.

"10BD—Beam Dump", Standa in Lithuania, Vilnius, Lithuania, [retrieved from the internet on Oct. 6, 2005], URL www.stand.IT/products/catalog/lasers_laser_accessories?item=202 &prod+beam_dump.

Campbell, P., et al., "Light trapping and reflection control in solar cells using tilted crystallographic surfaces textures", *Solar Energy Materials and Solar Cells 31* (1993) 133-153 North-Holland.

\* cited by examiner

HIGH CONTRAST LIQUID CRYSTAL DISPLAY AND PROJECTION SYSTEM USING SAME

FIELD OF THE INVENTION

The present invention relates to image projection systems. More specifically, the invention relates to projection systems that use liquid crystal imaging panels for generating the image.

BACKGROUND

Many image projection systems, such as might be used for projection televisions, are based on the use of liquid crystal display (LCD) imager panels. Some LCD panels operate in a reflective mode, in which incident illumination light is separated from reflected image light by using a polarizing beamsplitter in front of the LCD panel. In such configurations, the illumination light is passed to the LCD panel via the polarization beamsplitter. The illumination light incident at the LCD panel is, therefore, polarized. The LCD panel operates by selectively adjusting the polarization modulation of the many pixels of the panel. Those pixels associated with dark areas of the image do not alter the polarization state of the light whereas those pixels associated with bright areas of the image do alter the polarization state of the light. When the illumination light is reflected to the LCD panel by the polarization beamsplitter as reflected light, that light which has polarization that has been changed to the polarization state that is orthogonal to the polarization state of the incident light is transmitted through the polarization beamsplitter. Ideally, only the light corresponding to pixels that actively modulate the incident light is transmitted through the polarization beamsplitter to the projector's lens system, while light reflected by pixels that correspond to dark areas of the image, i.e. pixels that are not actively modulating the light, is rejected by the polarization beamsplitter. Thus, the beamsplitter can be used to separate the polarization modulated image light from the unmodulated light, which results in an image beam that can be projected.

An important characteristic of a display is the ANSI contrast ratio, as described in: Electronic Projection—Fixed Resolution Projectors", ANSI/NAPM IT7.228-1997, which is a measure of the maximum brightness of one pixel of the display relative to the minimum brightness of an adjacent pixel. Any "crossover" of light from a bright pixel to an adjacent dark pixel, for example resulting from reflection of light within the system, results in a reduction in ANSI contrast, and thus the quality of the viewed image is reduced. ANSI contrast is one means of characterizing the presence of stray light that is intended to illuminate a bright area of an image, but is redirected by scattering or unintended reflections into a nominally dark region of the image. Because it measures the stray light at the center of large dark regions (as described in the ANSI standard) it is not sensitive to light that is redirected only onto the edges of the nominally dark regions.

SUMMARY OF THE INVENTION

One embodiment of the invention is directed to a projection system that includes a projection lens unit, a color combiner and at least a first and a second image-forming devices capable of producing respective first and second image light beams when illuminated. The first and second image light beams from the at least two image-forming devices are combined in the color combiner to produce a color-combined image light beam containing at least a first color and a second color. The color-combined image light beam passes from the color combiner to the projection lens system. A first polarization control element is disposed between the color combiner and the first image-forming device. The first polarization control element is capable of altering polarization of light of the second color passing therethrough and not altering the polarization of light of the first color passing therethrough.

Another embodiment of the invention is directed to a projection system that includes a projection lens unit, a color combiner, and at least a first and a second image-forming devices capable of producing respective first and second image light beams when illuminated. The first and second image light beams from the at least two image-forming devices are combined in the color combiner to produce a color-combined image light beam containing at least a first color and a second color. The color-combined image light beam passes from the color combiner to the projection lens system. A first polarization control element is disposed between the color combiner and the first image-forming device. The first polarization control element is effective at altering polarization of light of the first color passing therethrough and not altering the polarization of light of the second color passing therethrough.

Another embodiment of the invention is directed to a projection system that includes a projection lens unit, a color combiner, a quarter-wave retarder disposed between the projection lens unit and the color combiner and at least a first and a second image-forming device capable of producing respective first and second image light beams when illuminated with light of a first color and a second color respectively. The first and second image light beams from the at least two image-forming devices are combined in the color combiner to produce a color-combined image light beam containing the first color and the second color. The color-combined image light beam passes from the color combiner to the projection lens unit. A first polarizing beamsplitter is disposed between the first image-forming device and the color combiner. A first polarization control element is disposed between the color combiner and the first polarizing beamsplitter. The first polarization control element is oriented to substantially prevent light at the second color from passing via the first polarizing beamsplitter to the first image-forming device.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The invention may be used in many different types of projection systems, and is believed to be particularly useful for increasing the ANSI contrast in the projected image. The standard for determining ANSI contrast is concerned with the stray light found at the center of large dark regions, and is relatively less concerned with light that is redirected only onto the edges of the nominally dark regions. The present invention is intended to address undesired light in all parts of the nominally dark regions, not just at their centers. However, ANSI contrast is generally accepted in the industry as the conventional metric for characterizing stray light in projection systems. It should be understood that there is also value to reducing stray light near the edges of the dark regions, and that such reduction in stray light is also an objective of the present invention.

Figure 1:
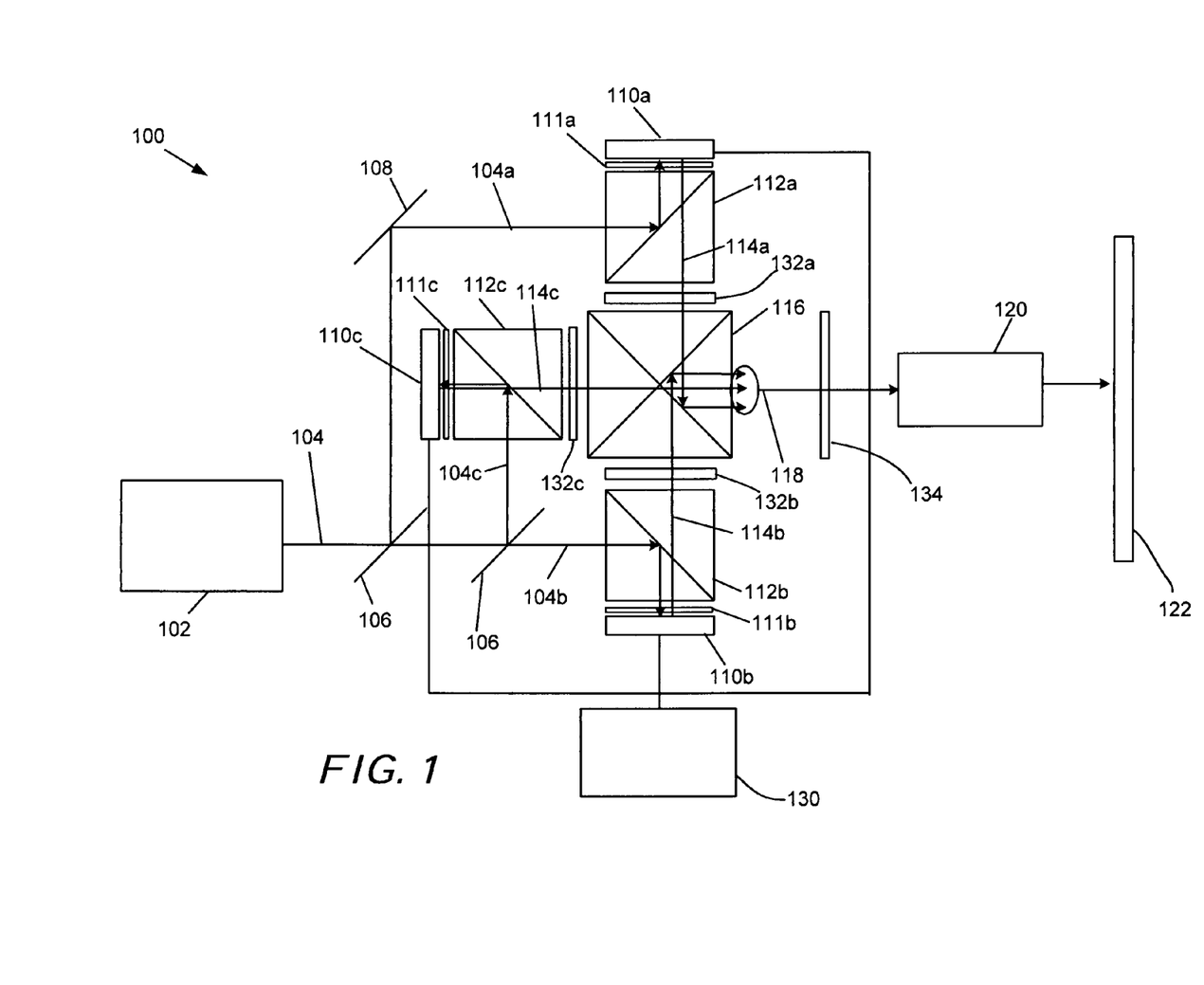
FIG. 1 schematically illustrates an embodiment of a projection system that increases ANSI contrast, according to principles of the present invention.

One exemplary embodiment of a multi-panel projection system 100 that may incorporate the invention described below is schematically illustrated in FIG. 1. The projection system 100 is a three-panel projection system, having a light source 102 that generates a light beam 104, containing light in three different color bands. The light beam 104 is split by color splitting elements 106 for example, dichroic mirrors, into first, second and third beams 104a, 104b and 104c containing light of different colors. The beams 104a, 104b and 104c may be, for example, blue, red and green in color respectively. Beam steering elements 108, for example mirrors or prisms, may be used to steer any of the beams 104, 104a, 104b and 104c.

It is useful for each arm of the projection system to be referred to as a channel. For example, the image-forming device 110a and PBS 112a may be considered to be in the first channel, the image-forming device 110b and PBS 112b may be considered to be in the second channel, and the image-forming device 110c and PBS 112c may be considered to be in the third channel. In some exemplary embodiments, the first channel is the blue channel, the second channel is the red channel and the third channel is the green channel. In other embodiments, the different channels may be associated with different colors.

The beams 104a, 104b and 104c are directed to respective image forming devices 110a, 110b and 110c which may be, for example, LCD-based reflective image-forming panels, such as liquid crystal on silicon (LCoS) panels. The light beams 104a, 104b and 104c are coupled to and from the respective image-forming devices 110a, 110b and 110c via respective polarizing beamsplitters (PBSs) 112a, 112b and 112c. The image-forming devices 110a, 110b and 110c polarization modulate the incident light beams 104a, 104b and 104c so that the respective image beams 114a, 114b and 114c are separated by the PBSs 112a, 112b and 112c and pass to the color combiner unit 116. In the illustrated exemplary embodiment, the illumination light beams 104a, 104b and 104c are reflected by the PBSs 112a, 112b and 112c to the image-forming devices 110a, 110b and 110c and the resulting image light beams 114a, 114b and 114c are transmitted through the PBSs 112a, 112b and 112c. In another approach, not illustrated, the illumination light may be transmitted through the PBSs to the image-forming devices, while the image light is reflected by the PBSs.

Retardation elements 111a, 111b, 111c, for example quarter-wave retardation elements, may be positioned between the image-forming devices 110a, 110b, 110c, and their respective PBSs 112a, 112b, 112c. The retardation elements 111a, 111b, 111c may be used for compensating for residual birefringence in the image forming devices 110a, 110b, 110c for compensating birefringence in the PBSs 112a, 112b, 112c. If the PBSs 112a, 112b, 112c are of the MacNeille type, then the retardation elements 111a, 111b, 111c may be used for compensating for skew ray effects as well as residual birefringence in the image forming devices.

In the illustrated exemplary embodiment, the color combiner unit 116 combines image light beams 114a, 114b and 114c of different colors, for example using one or more dichroic elements. In particular, the illustrated exemplary embodiment shows an x-cube color combiner, but other types of combiner may be used. The three image beams 114a, 114b and 114c are combined in the color combiner unit 116 to produce a single, colored image beam 118 that may be directed by a projection lens unit 120 to a projection screen 122. The projection lens unit 120 includes one or more lens elements that are used for projecting the colored image light beam to a screen.

A controller 130 is connected to the three image forming devices 110a, 110b, 110c. The controller 130 applies control signals to the image forming devices 110a, 110b, 110c that controls the image formed by each image forming device. The controller may be coupled to a video source, such as a computer or television tuner, to receive a video signal. The video signal is processed to produce the control signals that are directed to each of the image forming devices 110a, 110b, 110c.

Other embodiments of projection systems may use one or more PBSs. For example, a projection system may use one or two image-forming devices, with respective PBSs, as is described in greater detail in U.S. patent applications Ser. Nos. 10/439,449 and 10/914,596, incorporated herein by reference. The maximum number of image-forming devices is not limited to three, and projection systems may use more or fewer than three image-forming devices. In addition, different types of light sources may be used, including white light sources, such as high-pressure mercury lamps, and colored light sources, such as light emitting diodes. The intention with the illustrated embodiment is not to limit how the illumination light reaching the image forming devices is generated, nor to limit how the light is processed before reaching the image forming devices.

Polarization-control elements 132a-132c, for example half-wave retardation plates, are disposed between the color combiner unit 116 and the respective PBSs 112a-112c. The polarization-control elements 132a-132c are discussed in greater detail with respect to FIG. 2, which shows the core of the projection system (image-forming devices and color combiner). In the illustrated embodiment, the image light 114a is p-polarized within the PBS 112a. The polarization is rotated by the polarization control element 132a so that the image light 114a is s-polarized in the color combiner 116. Likewise, the polarization of the image light 114b is rotated by the polarization control element 132b so that the polarization state in the PBS 112b is p-polarized and the polarization state in the color combiner 116 is s-polarized. The polarization state of the image light 114c remains unchanged on passing through the polarization control element 132c, so that the image light 114c is p-polarized on passing through both the PBS 112c and the color combiner 116.

Figure 3A:
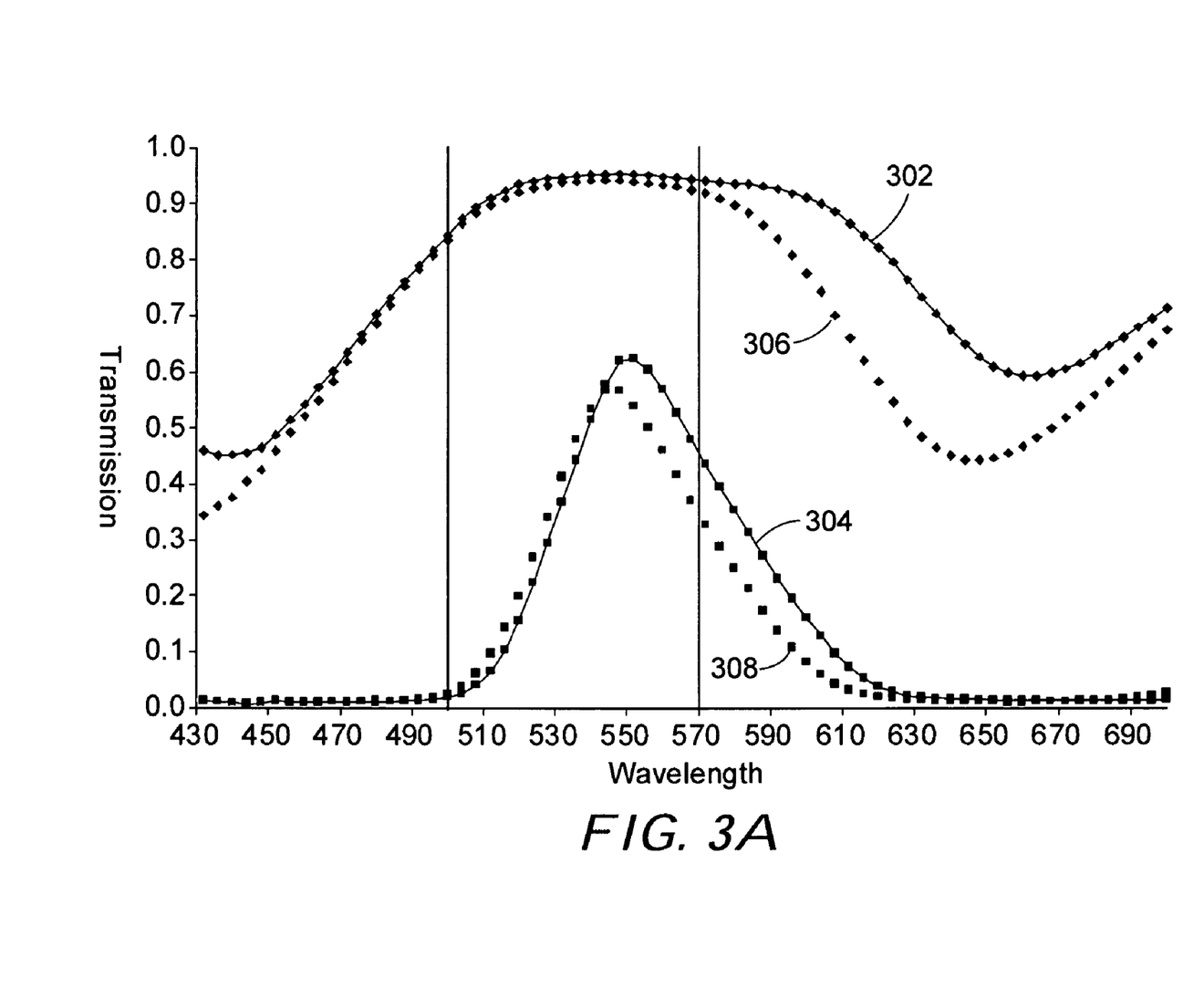
FIGS. 3A-3C show the spectra of transmitted and reflected light for two commercially available color combiners, for two orthogonal polarization states of light.

The reason for rotating the polarization of the image light 114a, 114b, while not rotating the polarization state of the image light 114c is explained with reference to FIGS. 3A-3C. First, for this exemplary embodiment, note that the image light 114a-114c, upon passing out of the respective PBSs 112a-112c, is in the polarization state that is transmitted through the PBSs 112a-112c. FIG. 3A presents a spectrum showing the light transmitted through two different, commercially available x-cube color combiners, color combiners A and B. Curves 302 and 304 show the transmitted throughput as a function of wavelength for p-polarized and s-polarized light respectively for color combiner A. Curves 306 and 308 show the transmitted throughput as a function of wavelength for p-polarized and s-polarized light respectively for color combiner B. In both cases, the color combiners have a maximum transmission for green light that is p-polarized. Accordingly, the image light 114c is colored green when these color combiners are used. The transmission of light in the s-polarization state is poor, with the result that a significant fraction of the light, depending on wavelength, is reflected by the color combiner.

Figure 3B:
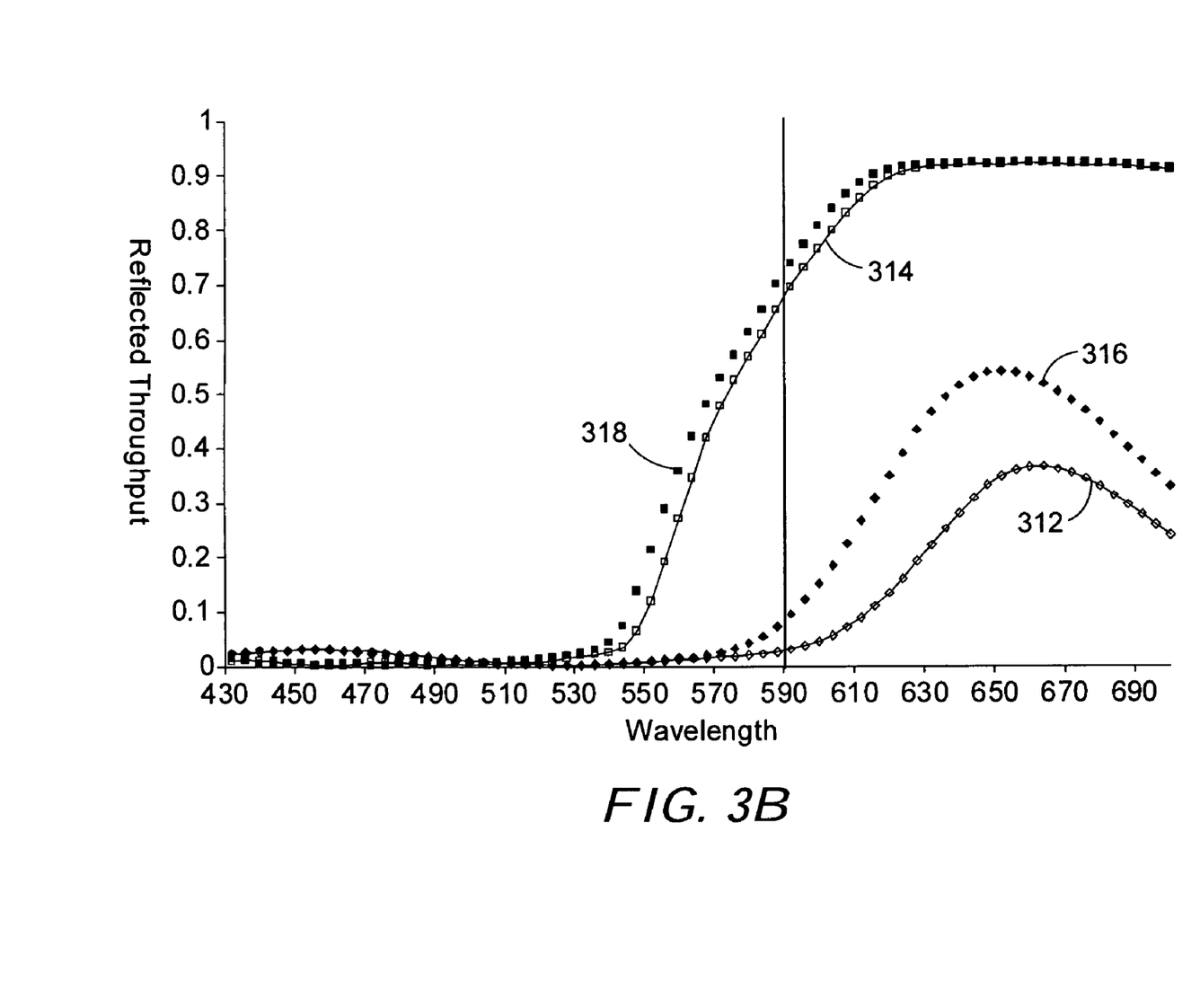

FIG. 3B shows the reflected throughput of the color combiners for red light. In the illustrated embodiment, red light is reflected at interface 216b. For s-polarized light, curves 314 and 318 for color combiners A and B respectively, the reflection is high for red wavelengths and is low for shorter wavelengths. For p-polarized light, curves 312 and 316 for color combiners A and B respectively, the reflected throughput is, at maximum, in the range of about 38%-54%, with the remainder of the p-polarized light being transmitted through the color combiner, rather than being reflected. Thus, for image light whose path through the color combiner is reflected, it is more efficient for the image light to be s-polarized than p-polarized.

Figure 3C:
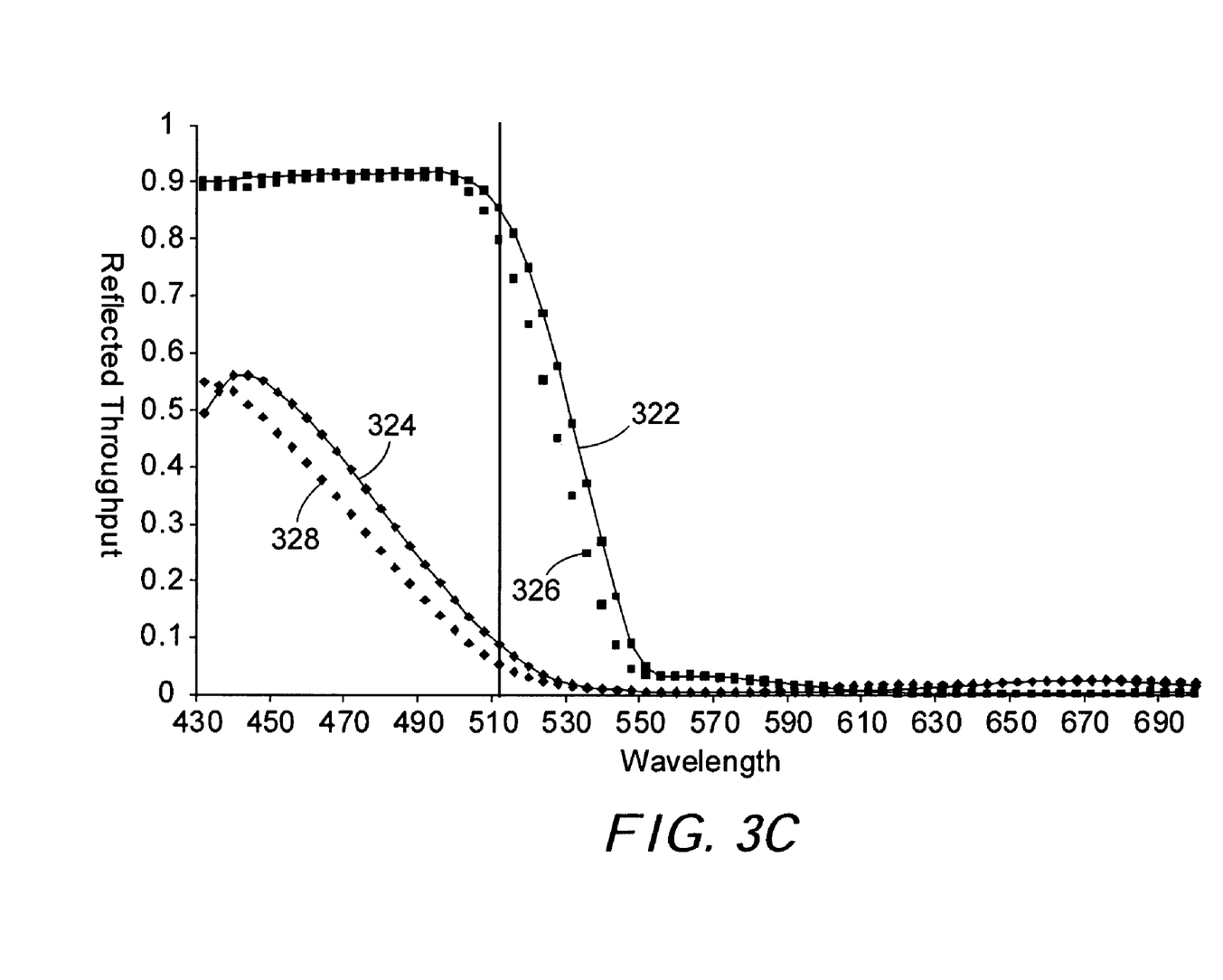

FIG. 3C shows the reflected throughput of the color combiners for blue light. In the illustrated embodiment, blue light is reflected at interface 216a. For s-polarized light, curves 324 and 328 for color combiners A and B respectively, the reflection is high for blue wavelengths and is low for longer wavelengths. For p-polarized light, curves 322 and 326 for color combiners A and B respectively, the reflected throughput has a maximum level of about 55%, with the remainder of the p-polarized light being transmitted through the color combiner, rather than being reflected.

For these embodiments of the color combiner, the reflection of the image light within the color combiner is more efficient for s-polarized light and the transmission of the image light through the color combiner is more efficient for p-polarized light. Hence, the polarization control elements 312a, 132b are used to rotate the polarization of the image light beams 114a, 114b passing therethrough.

Figure 2:
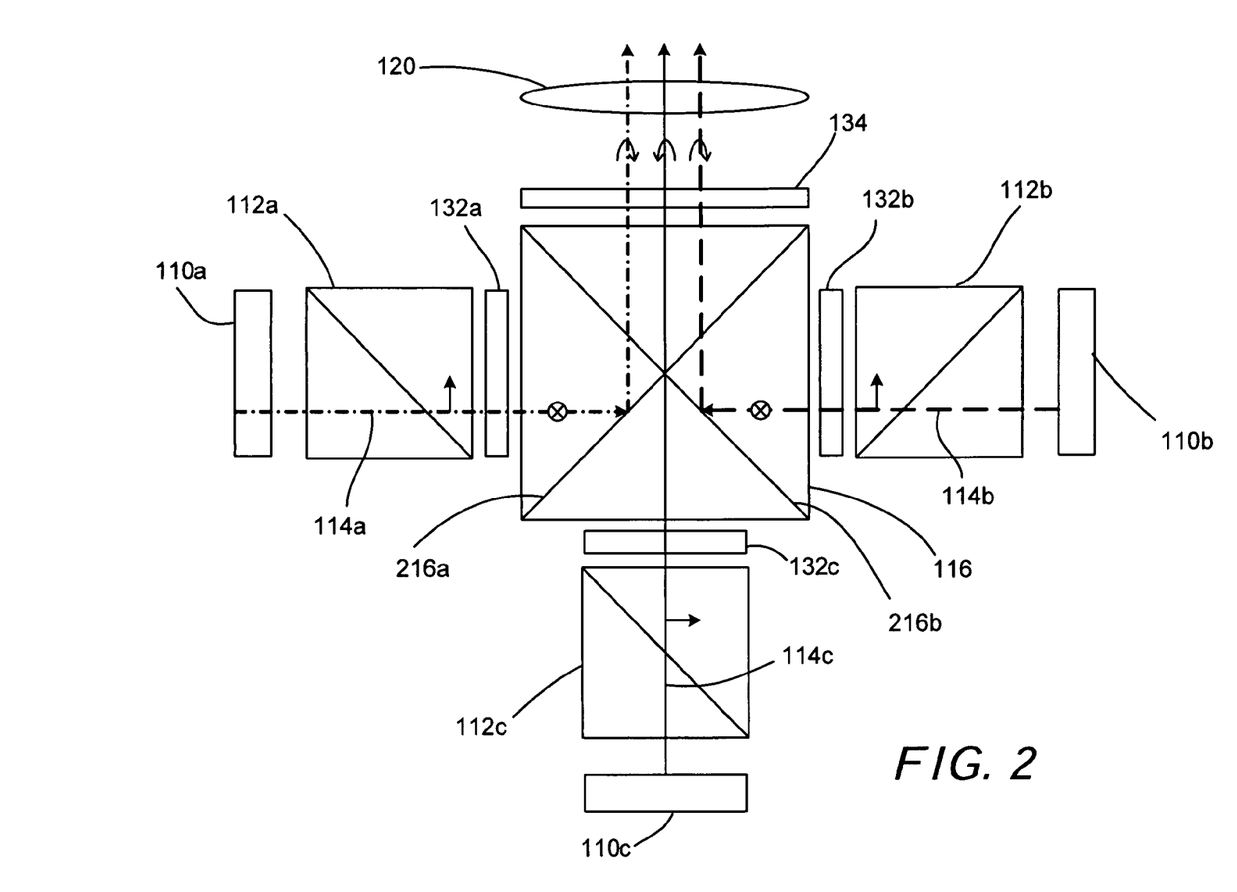
FIG. 2 schematically illustrates an embodiment of a core of a projection system, according to principles of the present invention.

A quarter-wave retarder 134 may be placed between the color combiner 116 and the projection lens unit 120, with an orientation such that the linearly polarized image light beams 114a-114c become circularly polarized before reaching the projection lens unit 120. Many projection systems include reflectors and other elements after the projection lens that have a polarization dependent characteristic and it is often desired that the different colored components of the combined light beam 118 have the same interaction with such polarization-dependent elements. The provision of circularly polarized light ensures that substantially equal parts of s- and p-polarization are present on all of these polarization sensitive elements, at all wavelengths, thereby minimizing any unintended or undesired chromatic effects resulting from differences in the treatment of s-and p-polarized light by those elements.

Figure 4:
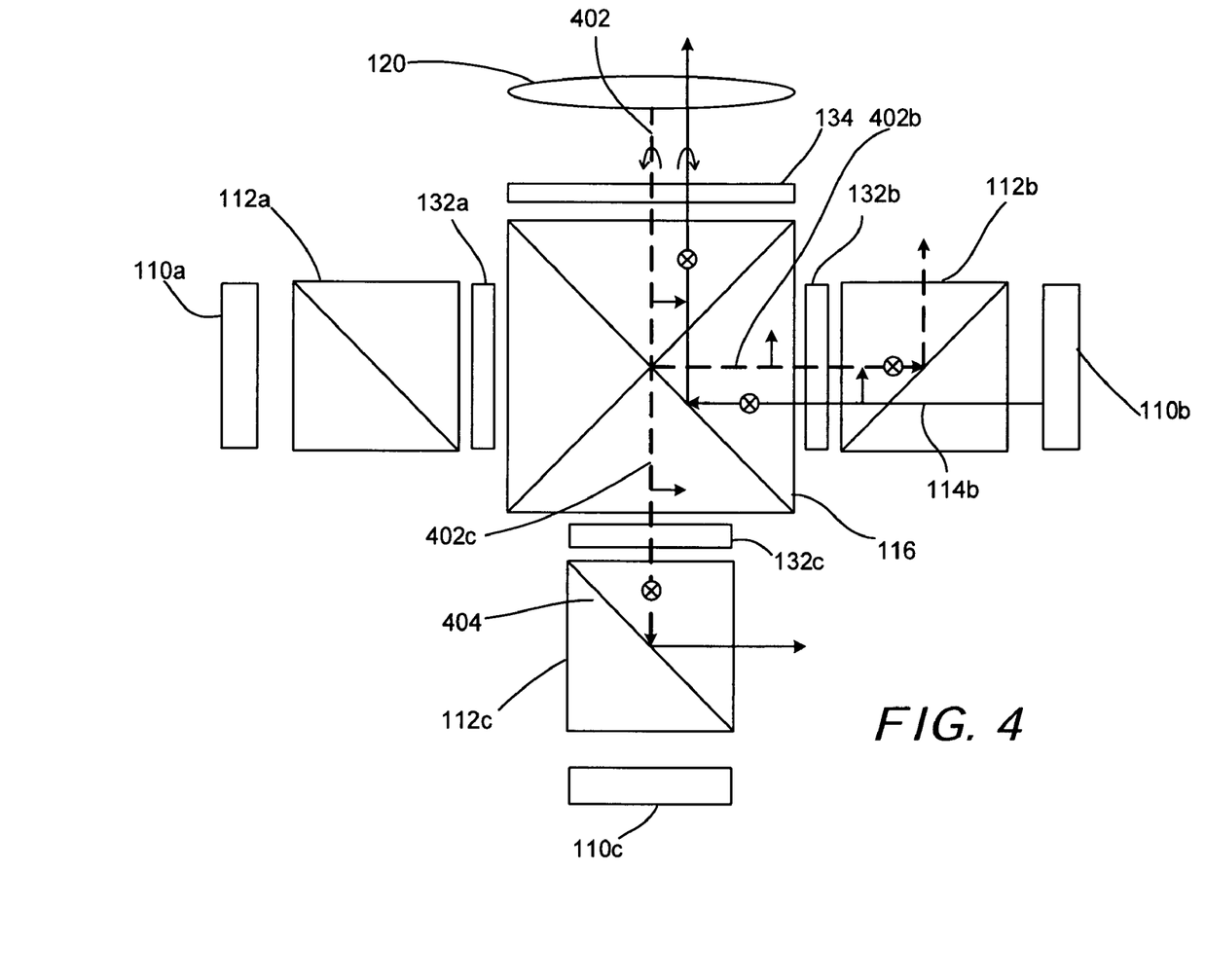
FIG. 4 schematically illustrates reflection of light of one channel within the core of the projection system of FIG. 2, according to principles of the present invention.

Another resultant effect from the use of the quarter-wave retarder 134 is to reject some of the light that is reflected back towards the image-forming devices 110a-110c, for example by reflection off an optical surface in the projection lens unit 120. FIG. 4 illustrates the reflection of image light 114b in the second channel. The light beam 114b is incident at the projection lens unit 120 in a circular polarization state. In the illustrated embodiment, the polarization state is shown as being clockwise (right circular). Reflected light beam 402 represents light that originated in light beam 114b that is reflected within the projection system, for example by the projection lens unit 120. The reflected light beam 402, which is incident at the quarter-wave retarder 134 with left circular polarization (counter-clockwise in the figure), is converted to linear polarization. However, the linear polarization of the beam 402 entering the color combiner 116 is substantially orthogonal to the linear polarization of the light beam 114 exiting the color combiner towards the projection lens unit 120. Where the light beam 114 contains red light, as is considered in FIG. 3B, the color combiner 116 only partially reflects beam 402 towards the image-forming device 110b as beam 402b. The remainder of the reflected beam is transmitted towards the third image-forming device 110c as beam 402c.

Light beam 402b passes through the polarization control element 132b, which rotates the polarization state from p-polarization to s-polarization and so the beam 402b is reflected by the PBS 112b and is substantially prevented from reaching the image-forming device 110b.

Light beam 402c, which is p-polarized, is transmitted through the color combiner 116 towards the third image-forming device 110c. The polarization control element 132c rotates the polarization of the light beam 402c to s-polarization so that the light 402 is substantially rejected by the PBS 112c, and light beam is largely prevented from reaching the third image-forming device 110c. If the polarization control element 132c were absent, the light beam 402c would reflect off unmodulated (dark state) pixels of the image-forming device 110c and be directed back towards the projection lens unit 120. Thus, dark state pixels would reflect more light and appear brighter, thus reducing ANSI contrast. The rejection of the light beam 402c by the polarization control element 132c and the PBS 112c thus reduces that amount of reflected light from the second channel that reaches the third channel, and so ensures that the ANSI contrast stays high.

Figure 5:
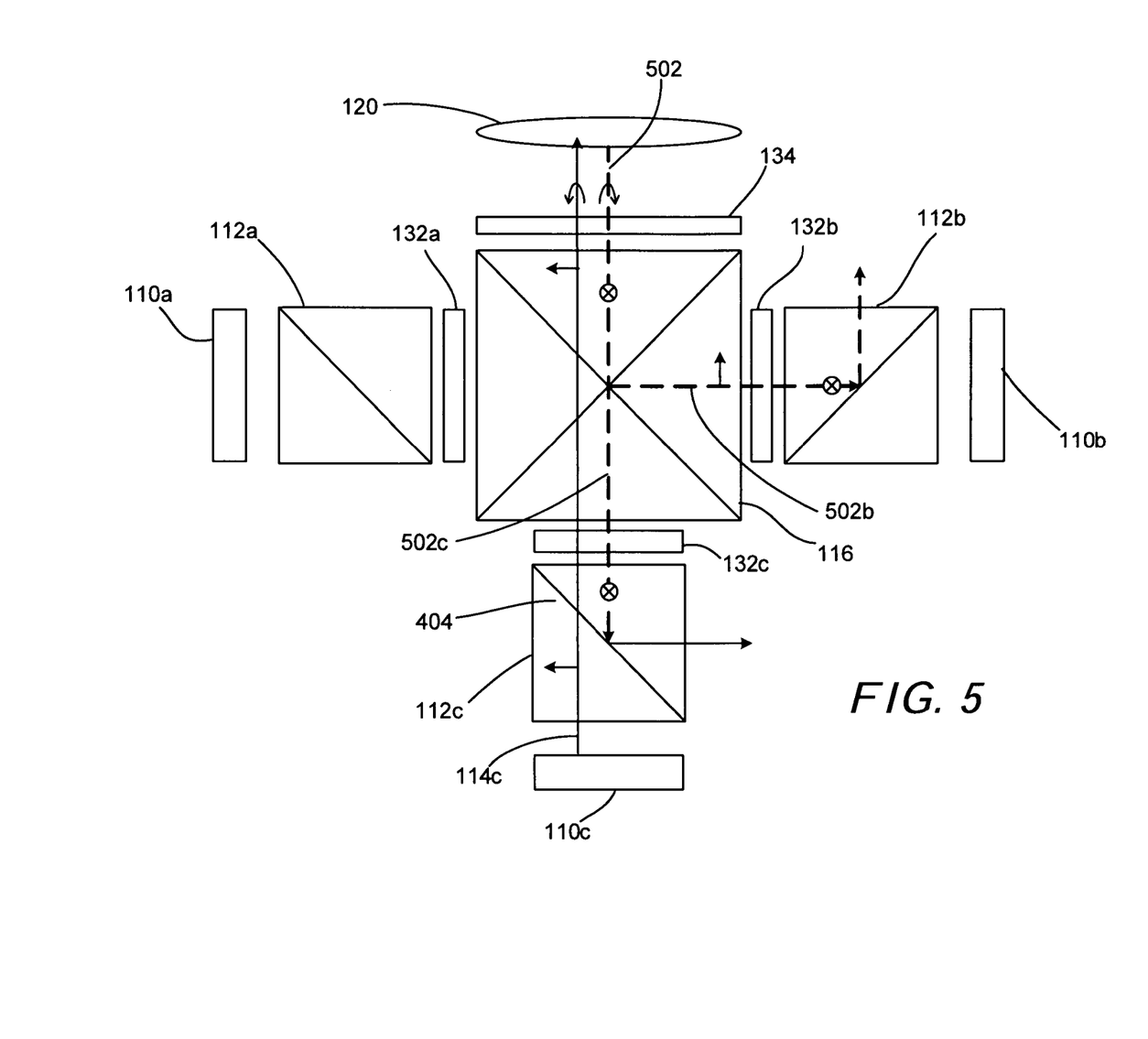
FIG. 5 schematically illustrates reflection of light of another channel within the core of the projection system of FIG. 2, according to principles of the present invention.

FIG. 5 schematically illustrates the reflection of image light 114c in the third channel. The image light 114c is incident at the projection lens unit 120 in a circular polarization state. Reflected light beam 502 represents light that originated in light beam 114c that is reflected within the projection system, for example by the projection lens unit 120. After passing back through the quarter-wave retarder 134, the reflected beam 502 is converted to s-polarization, a first portion of which 502c is transmitted towards the third image-forming device 110c and a second portion of which is directed towards the second image-forming device 110b. The polarization of light of the third channel is unaffected by the third polarization control element 132c, and so reaches in the third PBS 112c in the s-polarization state. The third PBS substantially reflects the light 502c and so little of the reflected light 502c reaches the third image-forming device 110c.

The second portion of reflected light 502b is reflected by the color combiner 116 towards the second image-forming device 110b. The second polarization control element 132b does not significantly affect the polarization state of the reflected light 502b, and so the reflected light 502b reaches the second PBS 112b in the s-polarization state. The s-polarized light 502b is substantially reflected by the PBS 112b and so little of the reflected light 502b reaches the second image-forming device 110b.

Thus, a polarization control element, associated with a certain image-forming device in one channel, is oriented to substantially prevent light from another channel from passing via a polarizing beamsplitter to the image-forming device.

It is useful to consider the requirements of the polarization control elements 132a-132c together. From the above discussion of FIGS. 4 and 5, the second polarization control element 132b is used to rotate the polarization of light of the second channel but not to rotate the polarization of the reflected light of the third channel. The third polarization control element 132c is also used to rotate the polarization of the reflected light of the second channel, but not to rotate the polarization of the light of the third channel. Consideration of the reflected light of the first channel leads to the conclusion that the second and third polarization control elements 132b and 132c also need to rotate the polarization of the reflected light of the first channel. Furthermore, in the first polarization control element 132a is used to rotate the polarization of the light of the first channel and the reflected light of the third channel, while not rotating the polarization of the reflected light of the second channel. Thus, for the exemplary embodiment where the first channel is the blue channel, the second channel is the red channel and the third channel is the green channel, the polarization control elements 132a-132c rotate the polarization of blue and red light, while not rotating the polarization of green light.

Another way of describing this approach is that a first polarization control element is disposed between the color combiner and the first polarizing beamsplitter. The first polarization control element is oriented to substantially prevent light at the second color from passing via the first polarizing beamsplitter to the first image-forming device.

Figure 6:
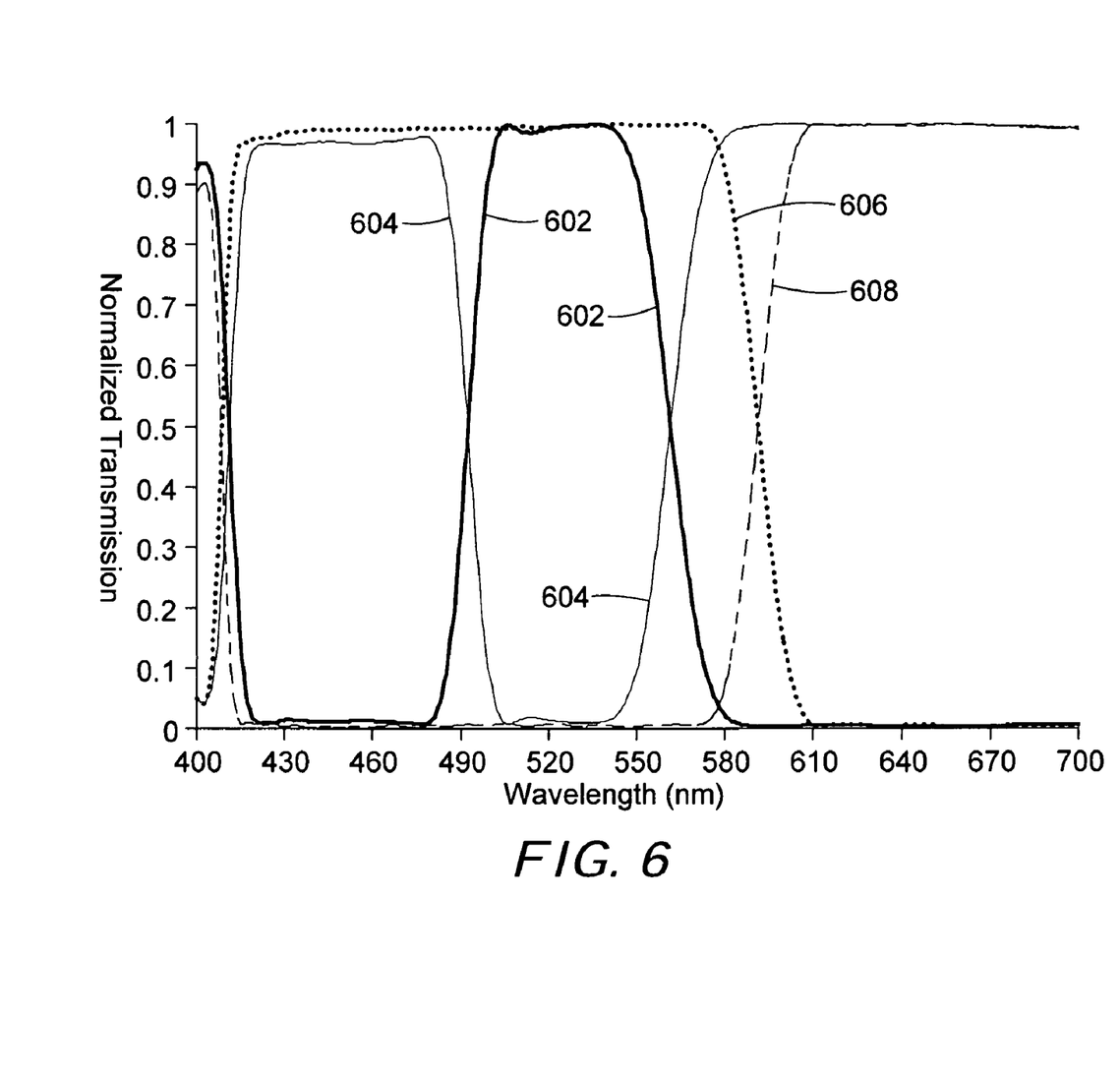
FIG. 6 shows spectra of transmitted light through a pair of polarizers placed on either side of spectrally varying half-wave retarder elements, for different relative orientations of the polarizers.

Retardation plates that provide a half-wave rotation for light of one or two colors, while not rotating the polarization of light of a third color, are available, for example from Colorlink Inc., Boulder, Colo. FIG. 6 shows the spectra formed by two different Colorlink wave plates. The spectra show the light transmitted through a pair of polarizers where the wave plate was positioned between the polarizers. Curves 602 and 604 were obtained using a MG2-type wave plate. Curve 602 was obtained with the transmission axes of the polarizers oriented parallel and curve 604 was obtained with the transmission axes perpendicular. Curves 606 and 608 were obtained using a RC14-type wave plate. Curve 606 was obtained with the transmission axes of the polarizers oriented parallel and curve 608 was obtained with the transmission axes perpendicular.

When placed between two parallel polarizers, the MG2-type wave plate transmits green light while blocking red and blue light, and blocks green light when placed between crossed polarizers. Thus, the MG2-type wave plate does not alter the polarization state of green light, but at the same time, rotates the polarization of red and blue light through approximately 90°. Thus, the MG2-type wave plate may be used in the configuration illustrated in FIGS. 4 and 5 as the polarization control elements 132a-132c.

When placed between two parallel polarizers, the RC14-type wave plate transmits blue and green light while blocking red light, and blocks blue and green light when placed between crossed polarizers. Thus, the RC14-type wave plate may also be used for the red and green channels.

Figure 7:
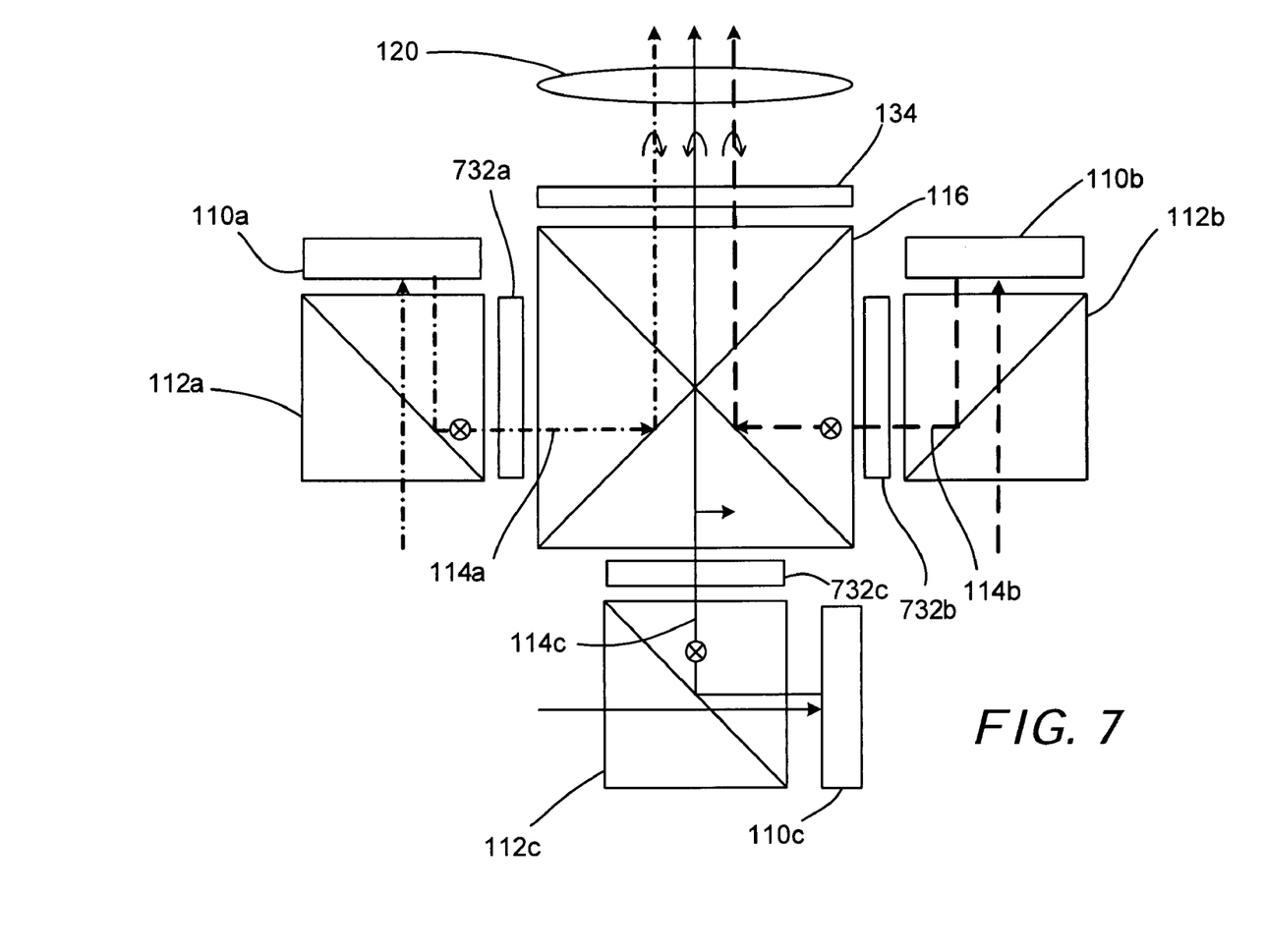
FIG. 7 shows another embodiment of a core of a projection system, according to principles of the present invention.

In some other embodiments of projection system, the image light is reflected by the PBSs, rather than being transmitted. This type of configuration is suitable, for example, for a wire grid PBS. An exemplary embodiment of such a system is schematically illustrated in FIG. 7. In this embodiment, the third polarization control element 732c rotates the polarization of the light of the third channel, while not rotating the polarization of the reflected light from the first and second channels. Also, the first and second polarization control elements 732a and 732b, do not rotate the polarization of the light in the first and second channels, but do rotate the polarization of the reflected light in the third channel. This reduces the amount of reflected light reaching the image-forming devices 110a-110c, and so helps to maintain a high ANSI contrast.

Figure 8A:
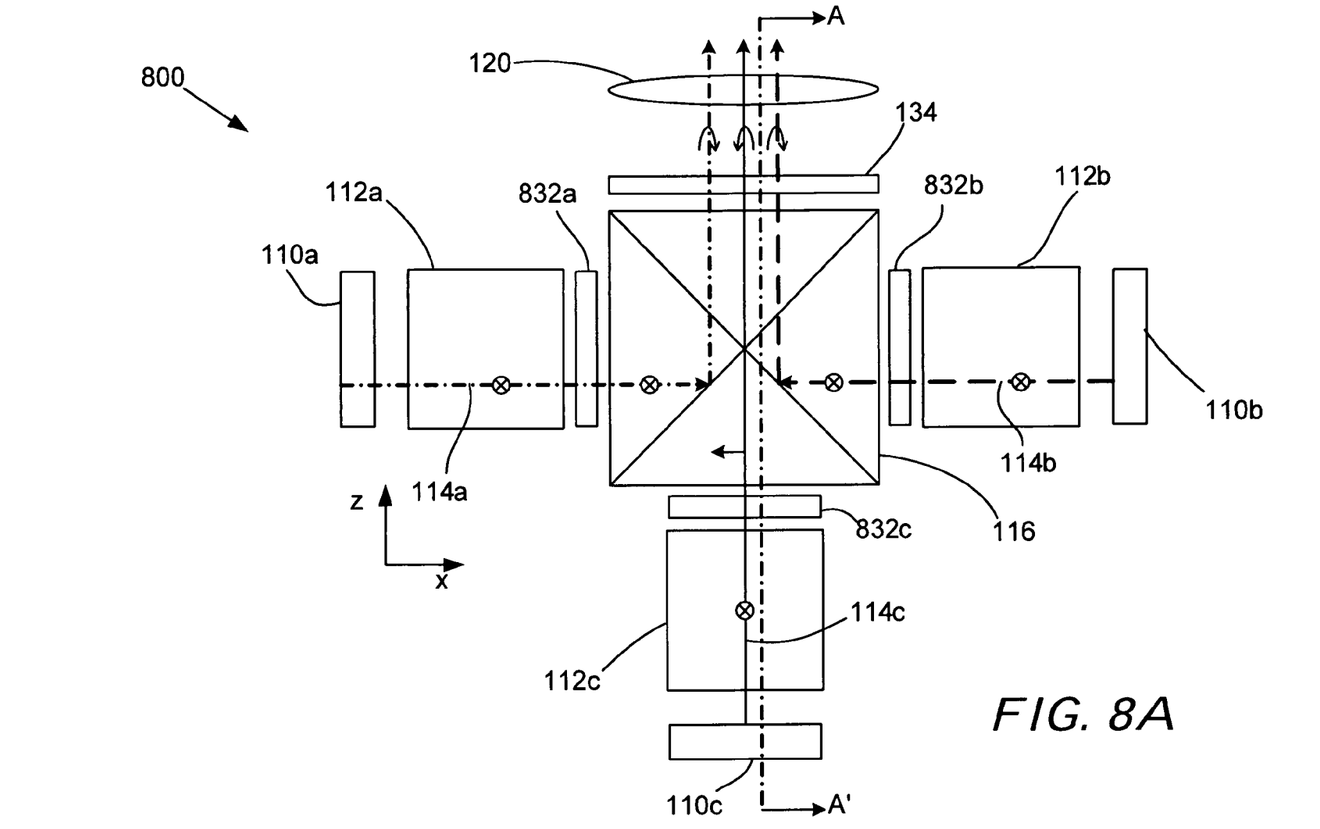
FIG. 8 shows another embodiment of a core of a projection system, according to principles of the present invention.
Figure 8B:
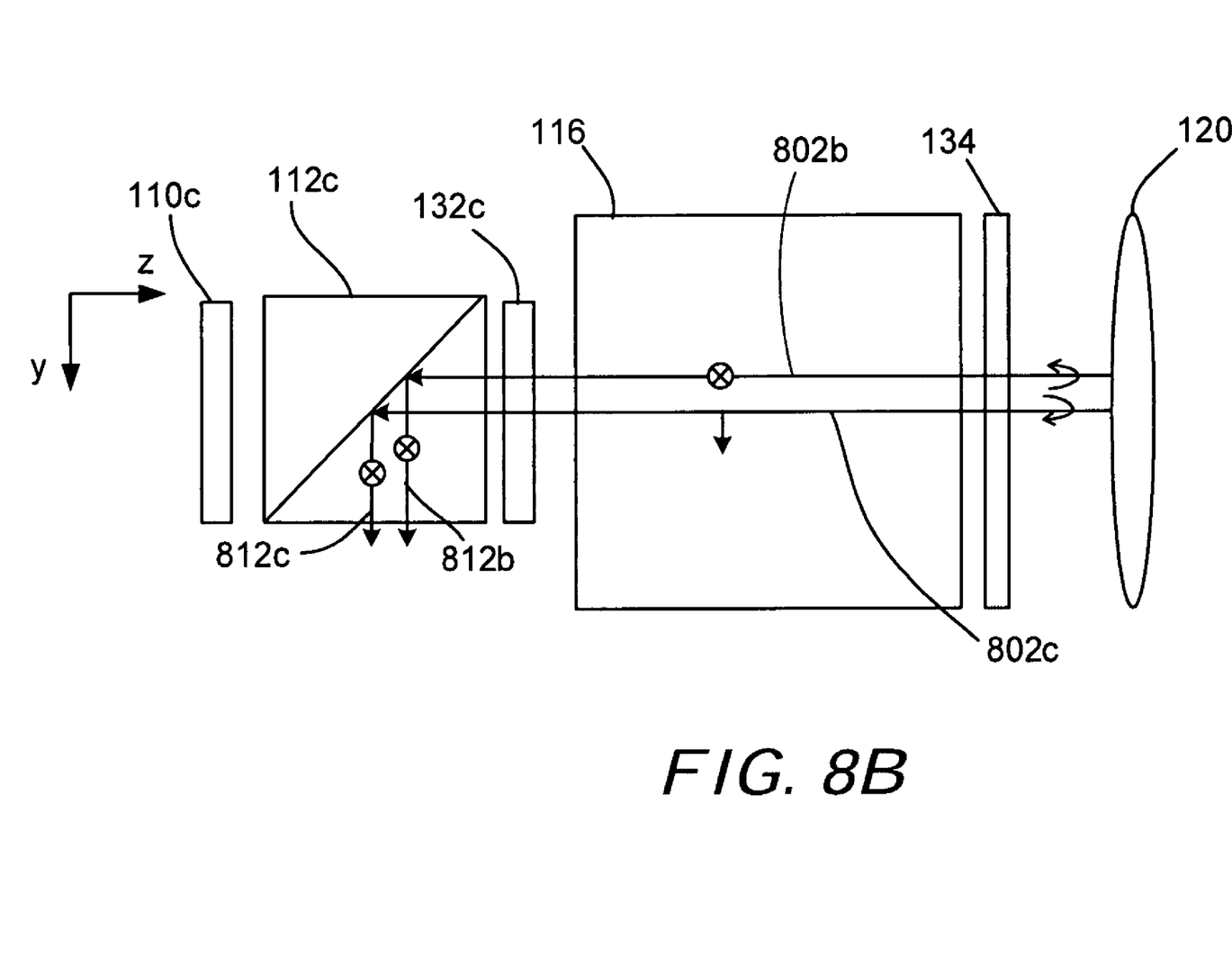

In the embodiments illustrated in FIGS. 2, 4, 5 and 7, the reflection planes of the PBSs are parallel to the reflection plane of the color combiner: the reflection plane is that plane that is defined by the incoming ray and the reflected ray. In other embodiments, the reflection planes of the PBSs are not parallel to the reflection plane of the color combiner. An exemplary embodiment of such a configuration is schematically illustrated in FIGS. 8A and 8B. FIG. 8A shows a plan view of the projection system 800 and FIG. 8B shows a side view of the cross-section AA' through the system 800. The plane of reflection of the color combiner 116 is the x-z plane, while the plane of reflection of the third PBS 112c is the y-z plane, as shown in the two figures. In this embodiment, the third image light beam 114c is linearly polarized parallel to the z-direction and is transmitted through the third PBS 112c. The third polarization control element 832c rotates the polarization of the image light beam 114c so that the light beam 114c is polarized parallel to the x-direction for transmission through the color combiner 116. At the same time, the first and second polarization control elements 832a and 832b do not rotate the polarization state of the light of the first and second channels respectively, so that the first and second image light beams 114a, 114b are transmitted through the respective first and second PBSs 112a, 112b and are reflected in the color combiner 116.

The reflected light of the third channel 802c passes back through the color combiner 116 polarized parallel to the y-axis. That portion 812c of the reflected third channel light 802c that is transmitted towards the third image-forming device 110c has its polarization rotated by the third polarization control element 832c to be parallel to the x axis so that the light 812c is substantially reflected by the PBS 112c and is directed away from the third image-forming device 110c.

The reflected light of the second channel 802b passes back through the color combiner 116 polarized parallel to the x-axis. That portion 812b of the reflected second channel light 802b that is transmitted towards the third image-forming device 110c does not have its polarization rotated by the third polarization control element 832c, and so is substantially reflected by the PBS 112c and is directed away from the third image-forming device 110c.

A consideration of the first and second channels for this embodiment leads to the conclusion that the first and second polarization control elements 832a, 832b do not rotate the polarization of light for the first and second channels, but do rotate the polarization of the reflected light of the third channel.

Thus, for this particular embodiment, the polarization control elements rotate the polarization of the light of the third channel, while not rotating the polarization of the light of the first and second channels.

It will be appreciated that many optical components do not perform ideally. For example, a polarizing beamsplitter is often considered to split unpolarized light into two light beams of orthogonal polarization while, in reality, the two beams contain a major component of one polarization state and a minor component of the other polarization state. Thus, the polarizing beamsplitter only produces substantially polarized light beams, and not perfectly polarized light beams. It should be understood that the components used in an embodiment of the invention described above need not operate ideally, but still fall within the scope of the following claims.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A projection system, comprising:
   a projection lens unit;
   a color combiner;
   at least a first and a second image-forming devices capable of producing respective first and second image light beams when illuminated, the first and second image light beams from the at least two image-forming devices being combined in the color combiner to produce a color-combined image light beam containing at least a first color and a second color, the color-combined image light beam passing from the color combiner to the projection lens system;
   a first polarization control element disposed between the color combiner and the first image-forming device, the first polarization control element being capable of altering polarization of light of the first color passing therethrough and not altering the polarization of light of the second color passing therethrough; and
   a second polarization control element disposed between the color combiner and the second image-forming device, the second polarization control element being effective at altering polarization of light of the second color passing therethrough and not altering the polarization of light of the first color passing therethrough.

2. A system as recited in claim 1, wherein the second polarization control element is a half-wave retardation plate oriented so as to rotate the polarization of light of the second color by about 90°.

3. A system as recited in claim 1, further comprising a first polarizing beamsplitter disposed between the color combiner and the first image-forming device and a second polarizing beamsplitter disposed between the color combiner and the second image-forming device.

4. A system as recited in claim 3, wherein light reflected by the first polarizing beamsplitter defines a first reflection plane and light reflected by the color combiner defines a second reflection plane, the first and second reflection planes being parallel.

5. A system as recited in claim 3, wherein light reflected by the first polarizing beamsplitter defines a first reflection plane and light reflected by the color combiner defines a second reflection plane, the first and second reflection planes being perpendicular.

6. A system as recited in claim 3, wherein image light propagating from the first image-forming device to the color combiner is transmitted through the first polarizing beamsplitter.

7. A system as recited in claim 3, wherein image light propagating from the first image-forming device to the color combiner is reflected by the first polarizing beamsplitter.

8. A projection system, comprising:
   a projection lens unit;
   a color combiner;
   a quarter-wave retarder disposed between the projection lens unit and the color combiner;
   at least a first and a second image-forming device capable of producing respective first and second image light beams when illuminated with light of a first color and a second color respectively, the first and second image light beams from the at least two image-forming devices being combined in the color combiner to produce a color-combined image light beam containing the first color and the second color, the color-combined image light beam passing from the color combiner to the projection lens system;
   a first polarizing beamsplitter disposed between the first image-forming device and the color combiner;
   a first polarization control element disposed between the color combiner and the first polarizing beamsplitter, the first polarization control element being oriented to substantially prevent light at the second color from passing via the first polarizing beamsplitter to the first image-forming device; and
   a second polarizing beamsplitter disposed between the color combiner and the second image-forming device and a second polarization control element disposed between the color combiner and the second polarizing beamsplitter, the second polarization control element being oriented to substantially prevent light at the first color from passing to the second image-forming device via the second polarizing beamsplitter.

* * * * *